(12) United States Patent  
Dettinger et al.

(10) Patent No.: US 8,650,205 B2  
(45) Date of Patent: *Feb. 11, 2014

(54) PROGRAM INVOCATION FROM A QUERY INTERFACE TO PARALLEL COMPUTING SYSTEM

(71) Applicant: International Business Machines Corporation, Armonk, NY (US)

(72) Inventors: Richard D. Dettinger, Rochester, MN (US); Mark G. Megerian, Rochester, MN (US); Amanda Peters, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,662

(22) Filed: Dec. 11, 2012

(65) Prior Publication Data

US 2013/0097155 A1 Apr. 18, 2013

Related U.S. Application Data

(63) Continuation of application No. 12/248,181, filed on Oct. 9, 2008, now Pat. No. 8,380,730.

(51) Int. Cl.
*G06F 17/30* (2006.01)

(52) U.S. Cl.
USPC .......................... 707/764; 707/767; 707/771

(58) Field of Classification Search
None
See application file for complete search history.

(56) References Cited

U.S. PATENT DOCUMENTS

| | | | |
|---|---|---|---|
| 6,424,980 B1 | 7/2002 | Iizuka et al. |
| 7,558,785 B2 | 7/2009 | Dettinger et al. |
| 7,617,201 B1 | 11/2009 | Bedell et al. |
| 7,624,098 B2 | 11/2009 | Dettinger et al. |
| 8,200,654 B2 | 6/2012 | Dettinger et al. |
| 2002/0133488 A1 | 9/2002 | Bellis et al. |
| 2003/0014505 A1 | 1/2003 | Ramberg et al. |
| 2003/0217045 A1 | 11/2003 | Yao et al. |
| 2003/0217097 A1 | 11/2003 | Eitel |

(Continued)

FOREIGN PATENT DOCUMENTS

| | | | |
|---|---|---|---|
| JP | 2001154847 A | 6/2001 |
| JP | 2002328961 A | 11/2002 |
| JP | 2004110262 A | 4/2004 |
| JP | 2005512176 A | 4/2005 |

(Continued)

OTHER PUBLICATIONS

U.S. Appl. No. 12/248,181, entitled "Program Invocation From a Query Interface to Parallel Computing System", filed Oct. 9, 2008.

(Continued)

*Primary Examiner* — Sherief Badawi  
(74) *Attorney, Agent, or Firm* — Patterson & Sheridan LLP

(57) ABSTRACT

Techniques are disclosed for invoking an analysis routine running on a parallel computer system to analyze query results. A query generated using a query builder application for execution against a database to produce query results. Embodiments receive a selection of one of a plurality of analysis routines to apply to the query results. A command and the query results are transmitted to a compute node of a parallel computer system using an established network connection. Embodiments invoke the selected analysis routine on the parallel computing system using the translated command and the query results to produce analysis routine results. The analysis routine results are merged with the query results to produce merged results, and the merged results are output for display.

18 Claims, 10 Drawing Sheets

(56) References Cited

U.S. PATENT DOCUMENTS

| | | |
|---|---|---|
| 2003/0236688 A1 | 12/2003 | Kadaba et al. |
| 2004/0143567 A1 | 7/2004 | Dettinger et al. |
| 2006/0294123 A1 | 12/2006 | Altman |
| 2007/0101188 A1 | 5/2007 | Lin |
| 2009/0070297 A1 | 3/2009 | Hadzima, Jr. et al. |
| 2009/0132609 A1 | 5/2009 | Barsness et al. |
| 2009/0144232 A1 | 6/2009 | Duffy et al. |
| 2009/0150213 A1 | 6/2009 | Cyr et al. |
| 2010/0094893 A1 | 4/2010 | Dettinger et al. |

FOREIGN PATENT DOCUMENTS

| | | |
|---|---|---|
| JP | 2006285474 A | 10/2006 |
| JP | 2007004807 A | 1/2007 |
| JP | 2007219760 A | 8/2007 |

OTHER PUBLICATIONS

Rangwala et al., "Massively Parallel BLAST for the Blue Gene/L", 2005, pp. 1-6, IBM Systems and Technology Group, Rochester, MN.

Wu et al., "Detailed Analysis of Grid-Based Molecular Docking: A Case Study of CDOCKER—A CHARMm-Based MD Docking Algorithm", 2003, pp. 1549-1562.

FIG. 9

BUILD QUERY

902 — CHEMICAL SMILE EQUALS ONE OF: C1(C(C(C(C1Cl)C)O)(C)O)Cl, C(C(CO)(OC)CC)O
904

WHERE: RECEPTOR INPUT EQUALS: HIV-1 REVERSE TRANSCRIPTASE

WHERE: ENERGY OF INTERACTION  >  -50
906

RUN — 908

QUERY RESULTS

| JOBID | NAME | RECEPTOR | ANCHORS | ORIENTATIONS | CONFORMATIONS | VDW |
|---|---|---|---|---|---|---|
| 1 | LOPRODIOL | HIV-1 REVERSE TRANSCRIPTASE | 1 | 500 | 58 | -3.944332900000000E001 |

1002   1004

1000

PROGRAM INVOCATION FROM A QUERY INTERFACE TO PARALLEL COMPUTING SYSTEM

CROSS-REFERENCE TO RELATED APPLICATIONS

This application is a continuation of co-pending U.S. patent application Ser. No. 12/248,181, filed Oct. 9, 2008. The aforementioned related patent application is herein incorporated by reference in its entirety.

BACKGROUND

1. Field of the Invention

Embodiments of the invention generally relate to data processing, and more particularly, to invoking a parallel computing system analysis routine from a database query interface.

2. Description of the Related Art

Within large databases, with many different sources of information, there are huge demands on the query tools that make sense of this data. Query tools need to process data from different sources, in different formats, accept user requests, and provide useful answers in a short period of time. Many query tools have become very sophisticated in being able to merge data from different systems, and in some cases, do transformations of data. In some cases, enormous amounts of computing resources are required to perform the calculations needed to completely answer the questions being posed by an end user. These resources may be far beyond that which is available on the system running a database query, and may be far beyond the logic that could be captured in a user-defined function or stored procedure provided by a database management system.

For example, molecular docking plays an important role in structure-based drug design. For example, molecular docking is frequently used to predict a favorable binding orientation of small molecule drug candidates to their protein targets to predict the affinity and activity of the small molecule. The conformations and free energy can be calculated with a wide range of methods ranging from quantum mechanics to purely empirical energy functions. The accuracy of these functions is usually proportional to computational expense. Therefore, due the complexity involved with molecular docking, computation times can take an excessive amount of time. Given the biological and pharmaceutical significance of molecular docking, considerable efforts have been directed towards improving the methods used to predict docking

SUMMARY

One embodiment of the invention provides a method of invoking an analysis routine executed on a parallel computer system. The method includes submitting a query generated using a query builder application for execution against a database to produce query results. Additionally, the method includes receiving a selection of one of a plurality of analysis routines to apply to the query results. The method also includes transmitting a command and the query results to a compute node of a parallel computer system using an established network connection, where the compute node is configured to translate the command and the query results into a format recognized by the selected analysis routine, and where each of the plurality of analysis routines is configured to recognize input data in a respective one of a plurality of formats. The method further includes invoking the selected analysis routine on the parallel computing system using the translated command and the query results to produce analysis routine results, where the compute node is further configured to translate the command and the query results by extracting at least one of command strings, parameters, and variables from at least one of the command and the query results, where the compute node is further configured to write the translated command and the translated query results to an input file, and where the analysis routine is configured to parse the input file to obtain the translated command and the translated query results. Additionally, the method includes merging the analysis routine results with the query results to produce merged results, and outputting the merged results for display.

Another embodiment of the invention includes a computer-readable storage medium containing a program which, when executed, performs an operation for invoking an analysis routine executed on a parallel computer system. The operation includes submitting a query generated using a query builder application for execution against a database to produce query results. Additionally, the operation includes receiving a selection of one of a plurality of analysis routines to apply to the query results. The operation also includes transmitting a command and the query results to a compute node of a parallel computer system using an established network connection, where the compute node is configured to translate the command and the query results into a format recognized by the selected analysis routine, and where each of the plurality of analysis routines is configured to recognize input data in a respective one of a plurality of formats. The operation further includes invoking the selected analysis routine on the parallel computing system using the translated command and the query results to produce analysis routine results, where the compute node is further configured to translate the command and the query results by extracting at least one of command strings, parameters, and variables from at least one of the command and the query results, where the compute node is further configured to write the translated command and the translated query results to an input file, and where the analysis routine is configured to parse the input file to obtain the translated command and the translated query results. Additionally, the operation includes merging the analysis routine results with the query results to produce merged results, and outputting the merged results for display.

Still another embodiment of the invention includes a computing system having a processor and a memory containing a program that, when executed on the processor, performs an operation for invoking an analysis routine on a parallel computer system. The operation includes submitting a query generated using a query builder application for execution against a database to produce query results. Additionally, the operation includes receiving a selection of one of a plurality of analysis routines to apply to the query results. The operation also includes transmitting a command and the query results to a compute node of a parallel computer system using an established network connection, where the compute node is configured to translate the command and the query results into a format recognized by the selected analysis routine, and where each of the plurality of analysis routines is configured to recognize input data in a respective one of a plurality of formats. The operation further includes invoking the selected analysis routine on the parallel computing system using the translated command and the query results to produce analysis routine results, where the compute node is further configured to translate the command and the query results by extracting at least one of command strings, parameters, and variables from at least one of the command and the query results, where the compute node is further configured to write the translated command and the translated query results to an input file, and where the analysis routine is configured to parse the input file to obtain the translated command and the translated query results. Additionally, the operation includes merging the analysis routine results with the query results to produce merged results, and outputting the merged results for display.

BRIEF DESCRIPTION OF THE SEVERAL
VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 9 illustrates a GUI screen which presents a query to a user, according to another embodiment of the invention.

FIG. 10 illustrates a GUI screen which presents query results and analysis routine results merged into a single table, according to an embodiment of the invention.

DETAILED DESCRIPTION

Figure 1:
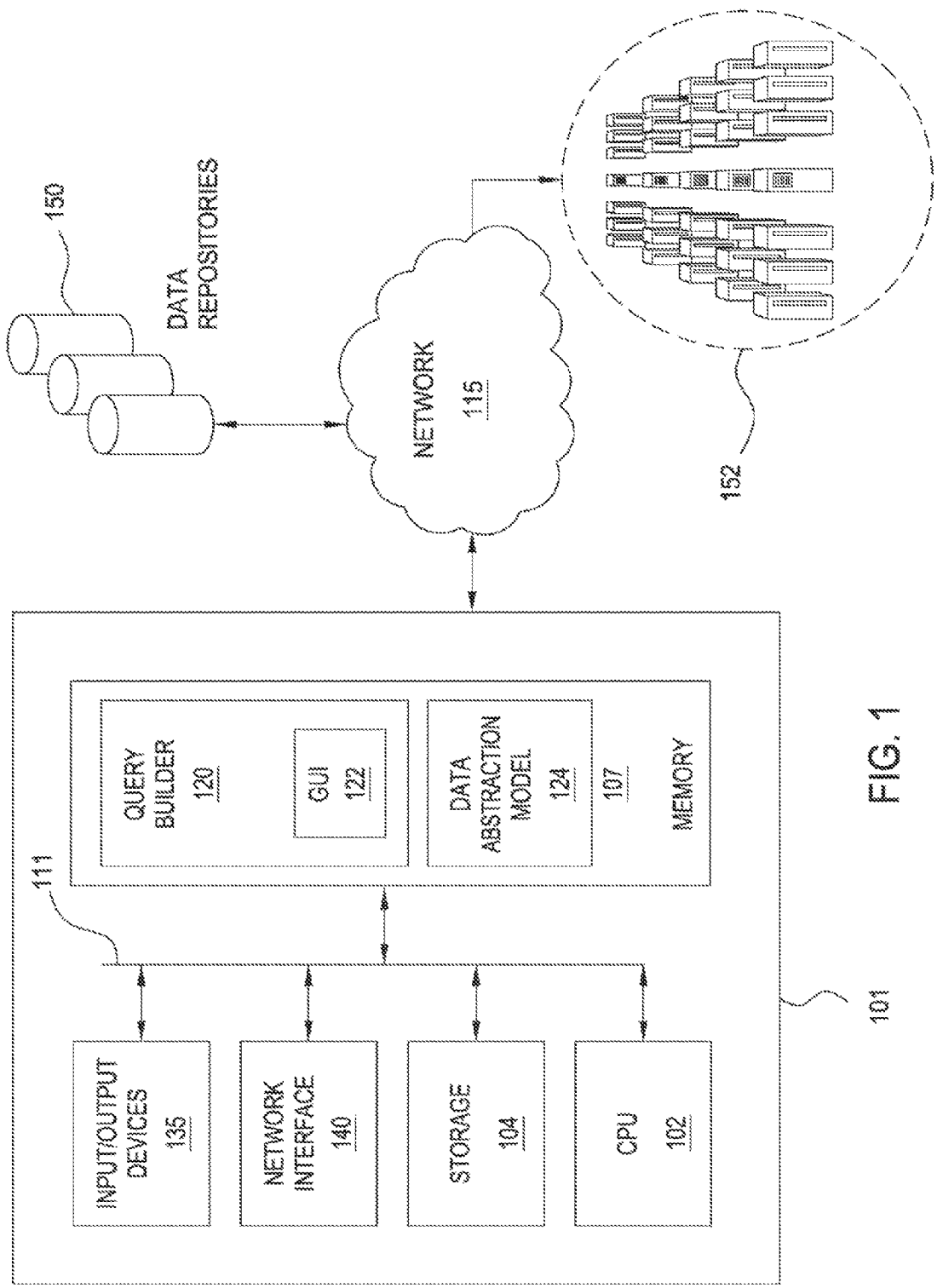
FIG. 1 is a block diagram illustrating a computing environment according to one embodiment of the invention.

Embodiments of the invention allow users to invoke an analysis routine running on a massively parallel computer system to analyze query results. For example, after receiving query results from query to a database, a user may perform complex analysis on the query results. Therefore, the user may select an analysis routine executed by a massively parallel computer system to perform the desired analysis using the query results. Alternatively, a user may build a query that, when executed by a query processing system, automatically invokes an analysis routine on a massively parallel computer system (as opposed to selecting an analysis routine after receiving query results). In either case, the query tool itself may be running on a compute node of the parallel computing system or running on a separate computing system configured to communicate with the parallel computing system over a network.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a computing environment 100 according to one embodiment of the invention. FIG. 1 shows a computer system 101 which is included to be representative of existing computer systems, e.g., desktop computers, server computers, laptop computers, tablet computers, and the like. However, the computer system 101 illustrated in FIG. 1 is merely an example of a computing system. Embodiments of the present invention may be implemented using other computing systems, regardless of whether the computer systems are complex multi-user computing systems, such as a cluster of individual computers connected by a high-speed network, single-user workstations, or network appliances lacking non-volatile storage. Further, the software application(s) described herein may be implemented using computer software application(s) executing on existing computer systems. However, the software application(s) described herein are not limited to any currently existing computing environment or programming language, and may be adapted to take advantage of new computing systems as they become available.

As shown, computer system 101 includes a central processing unit (CPU) 102, which obtains instructions and data via a bus 111 from memory 107 and storage 104. CPU 102 represents one or more programmable logic devices that perform all the instruction, logic, and mathematical processing in a computer. For example, CPU 102 may represent a single CPU, multiple CPUs, a single CPU having multiple processing cores, and the like. Storage 104 stores application programs and data for use by computer system 101. Storage 104 may be hard-disk drives, flash memory devices, optical media and the like. Computer system 101 may be connected to a data communications network 115 (e.g., a local area network, which itself may be connected to other networks such as the Internet).

Additionally, computer system 101 includes input/output devices 135 such as a mouse, a keyboard and monitor, as well as a network interface 140 used to connect computer system 101 to network 115.

Memory 107 can be one or a combination of memory devices, including random access memory, nonvolatile or backup memory, (e.g., programmable or flash memories, read-only memories, etc.). As shown, memory 107 includes a query builder application 120. In one embodiment, the query builder application 120 may be configured to enable a user to construct a query and to submit the query to a database for processing. The query builder application 120 may also include a graphical user interface (GUI) 122. The GUI 122 may be configured to allow a user to construct the queries and also display the results of an executed query. Although shown as part of computer system 101, the query builder application may instead be an application which executes on a parallel computing system 152.

In one embodiment, the memory 107 also includes a data abstraction model 124. In another embodiment, the data abstraction model 124 may be included in storage 104. The data abstraction model 124 models underlying data stored in the data repositories in a manner making a schema of the physical data transparent to the user. Thus, the data abstraction model 124 can be provided for accessing and modifying data (i.e. via the GUI 122) independent of the particular manner in which the data is physically represented.

Illustratively, computing environment 100 also includes a set of data repositories 150. In one embodiment, the data repositories 150 may serve as a database that provides the source of records processed by the query builder application 120. In one embodiment, the database may also be stored locally in the storage 104 of the computer system 101.

As shown, computing environment 100 also includes a massively parallel computer system 152. In one embodiment, the massively parallel computer system 152 may be used to perform compute-intensive analysis routines such as molecular docking algorithms on query results (or portions of query results). For example, suppose a scientist queries a database for molecular compounds (i.e. a ligand) having a particular structure. After receiving the query results for the ligand(s), the scientist may want to determine how well the ligand(s) binds with another molecule, for example a receptor. Accordingly, the scientist may execute a molecular docking analysis routine that calculates the energy of interaction between the ligand(s) and the receptor. Of course, one of skill in the art will recognize that a large parallel computing system may be used to analyze data related to variety of computational problems. For example, analysis routines have been developed that are related to cryptography and prime-number factoring and weather modeling and forecasting, to name but a couple examples.

In one embodiment, the analysis routine may be selected and executed after the query results are received and displayed to the user. In this case, the query builder application 120 may provide a list of analysis routines (via the GUI 122) available for the user to select. Once an analysis routine is selected, the query builder application 120 may invoke the analysis routine on the massively parallel computer system 152, where calculations are performed on the data returned from the query results.

Alternatively, an analysis routine may be automatically invoked on a massively parallel computer system 152 in response to a query condition of the query. In such a case, the query may contain conditions that either reference data stored in a database or reference results of parallel application processing. In one embodiment, to identify the type of data a query condition references, the data abstraction model 124 may associate extensions with query conditions that indicate whether a condition references data stored in a database (i.e. a database extension) or results of parallel application processing (i.e. a parallel application extension).

Thus, when a user submits the query for execution, the query builder application 120 may determine the extensions for each of the query conditions of a query. If the query builder application 120 determines that certain conditions have a database extension, the query builder application 120 may query the database using only those conditions. On the other hand, if the query builder application 120 determines that certain conditions have a parallel application extension, the query builder application 120 may invoke an analysis routine running on the massively parallel computing system 152 based on those conditions. Furthermore, an analysis routine may also be performed on results obtained by the query conditions having database extensions.

Figure 2:
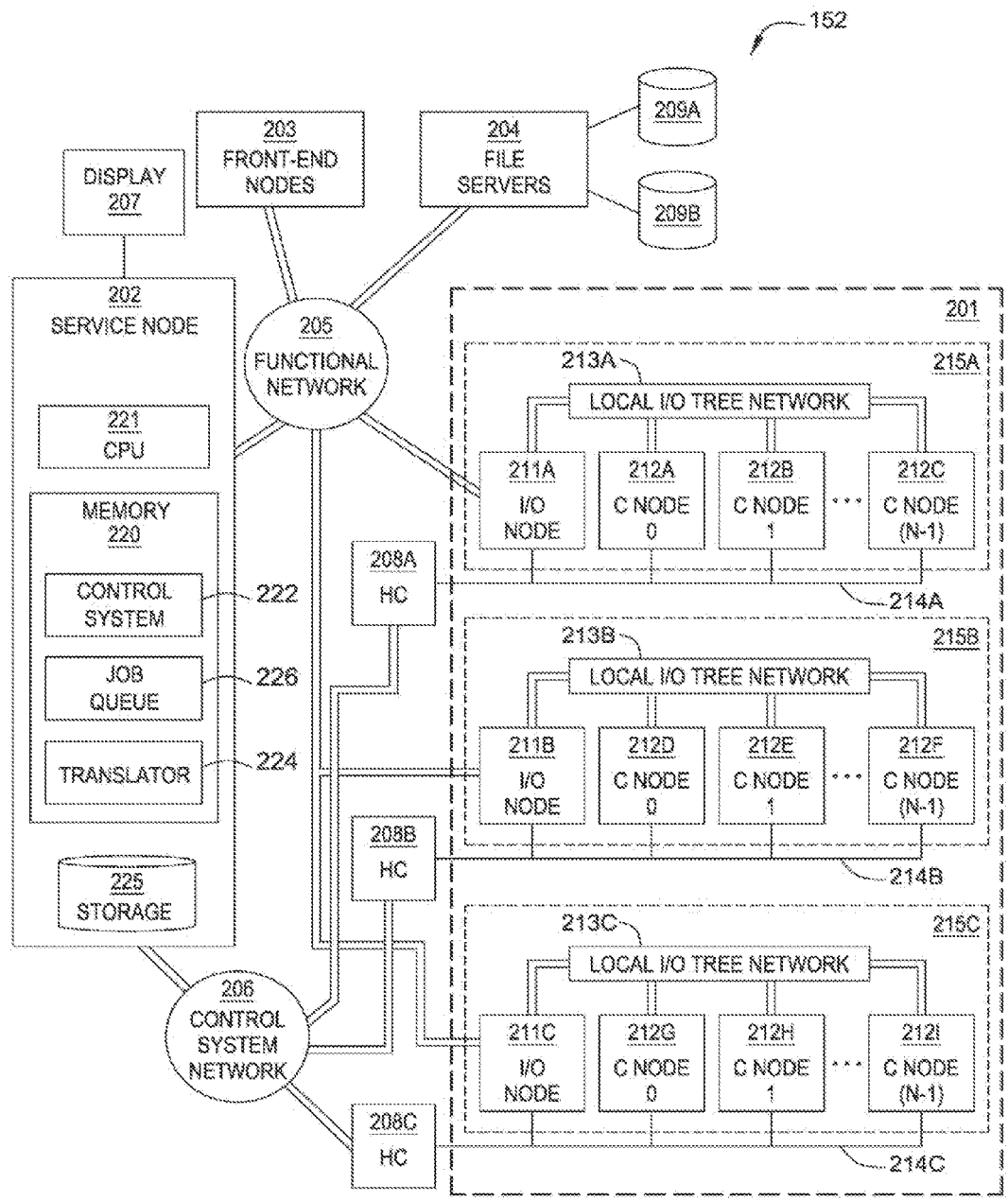
FIG. 2 is a block diagram illustrating components of a massively parallel computer system, according to one embodiment of the present invention.

FIG. 2 is a block diagram illustrating components of a massively parallel computer system 152, according to one embodiment of the present invention. Illustratively, computer system 152 shows the high-level architecture of an IBM Blue Gene® computer system, it being understood that other parallel computer systems could be used, and the description of a preferred embodiment herein is not intended to limit the present invention.

As shown, computer system 152 includes a compute core 101 having a plurality of compute nodes 212 arranged in a regular array or matrix. Compute nodes 212 perform the useful work performed by system 152. The operation of computer system 152, including compute core 201, may be controlled by service node 202. Various additional processors in front-end nodes 203 may perform auxiliary data processing functions, and file servers 204 provide an interface to data storage devices such as disk based storage 209A, 209B or other I/O operations. Functional network 205 provides the primary data communication path among compute core 201 and other system components. For example, data stored in storage devices attached to file servers 204 is loaded and stored to other system components through functional network 205.

Also as shown, compute core 201 includes I/O nodes 211A-C and compute nodes 212A-I. Compute nodes 212 provide the processing capacity of parallel system 100, and are configured to execute applications written for parallel processing. I/O nodes 211 handle I/O operations on behalf of compute nodes 212. For example, the I/O node 211 may retrieve data from file servers 204 requested by one of compute nodes 212. Each I/O node 211 may include a processor and interface hardware that handles I/O operations for a set of N compute nodes 212, the I/O node and its respective set of N compute nodes are referred to as a Pset. Compute core 201 contains M Psets 215A-C, each including a single I/O node 211 and N compute nodes 212, for a total of M×N compute nodes 212. The product M×N can be very large. For example, in one implementation M=1024 (1K) and N=64, for a total of 64K compute nodes.

In general, application programming code and other data input required by compute core 201 to execute user applications, as well as data output produced by the compute core 201, is communicated over functional network 205. The compute nodes within a Pset 115 communicate with the corresponding I/O node over a corresponding local I/O tree network 113A-C. The I/O nodes, in turn, are connected to functional network 205, over which they communicate with I/O devices attached to file servers 204, or with other system components. Thus, the local I/O tree networks 213 may be viewed logically as extensions of functional network 205, and like functional network 205, are used for data I/O, although they are physically separated from functional network 205.

Service node 202 may be configured to direct the operation of the compute nodes 212 in compute core 201. In one embodiment, service node 202 is a computer system that includes a processor (or processors) 221, internal memory 220, and local storage 225. An attached console 207 (i.e., a keyboard, mouse, and display) may be used by a system administrator or similar person to initialize computing jobs on compute core 201. Service node 202 may also include an internal database which maintains state information for the compute nodes in core 201, and an application which may be configured to, among other things, control the allocation of hardware in compute core 201, direct the loading of data on compute nodes 211, migrate process running on one of compute nodes 212 to another one of compute nodes 212, and perform diagnostic and maintenance functions. Illustratively, memory 220 includes a control system 222. In embodiments of the invention, control system 222 may be a software application configured to control the allocation of compute nodes 212 in compute core 201, direct the loading of application and data on compute nodes 211, and perform diagnostic and maintenance functions, among other things.

Illustratively, control system 222 includes a translator 224. The translator 224 may act as an interface between the query builder application 120 and an application (e.g. a molecular docking analysis routine) running on a massively parallel computer system 152. For example, the translator 224 may convert information from the query builder application 120 into a format understood by the molecular docking analysis routine. Such information may include a command to invoke the molecular docking analysis routine and query results obtained from query conditions having database extensions. The translator 224 may also convert results returned from the molecular docking analysis routine (e.g. molecular docking results) into a format that is understandable by the query builder application 120.

As shown, control system 222 may also include a job queue 226. The job queue 222 may store a plurality of jobs that await execution on a massively parallel computer system 152. In one embodiment, a job may be an invocation of the molecular docking analysis routine (or other parallel application program executed to analyze a set of database query results). For example, once the information received from the query builder application 120 has been translated by the translator 224, the control system 222 may store the information (i.e. the translated command and query results) into the job queue 226. The control system 222 may also select the jobs to execute from the job queue 226. In one embodiment, the job queue 226 may also provide notification that a job has been completed.

In one embodiment, service node 202 also communicates control and state information with the nodes of compute core 201 over control system network 206. Network 206 is coupled to a set of hardware controllers 208A-C. Each hardware controller communicates with the nodes of a respective Pset 215 over a corresponding local hardware control network 214A-C. The hardware controllers 208 and local hardware control networks 214 are logically an extension of control system network 206, although physically separate. In one embodiment, control system network 206 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to service node 202 in real-time. That is, while an application is running on compute core 201, network performance and/or network state data may be gathered and transmitted to service node 202 without affecting the performance of that application.

In addition to service node 202, front-end nodes 203 provide computer systems used to perform auxiliary functions which, for efficiency or otherwise, are best performed outside compute core 201. Functions which involve substantial I/O operations are generally performed in the front-end nodes 203. For example, interactive data input, application code editing, or other user interface functions are generally handled by front-end nodes 203, as is application code compilation. Front-end nodes 203 are also connected to functional network 205 and may communicate with file servers 204.

Figure 3:
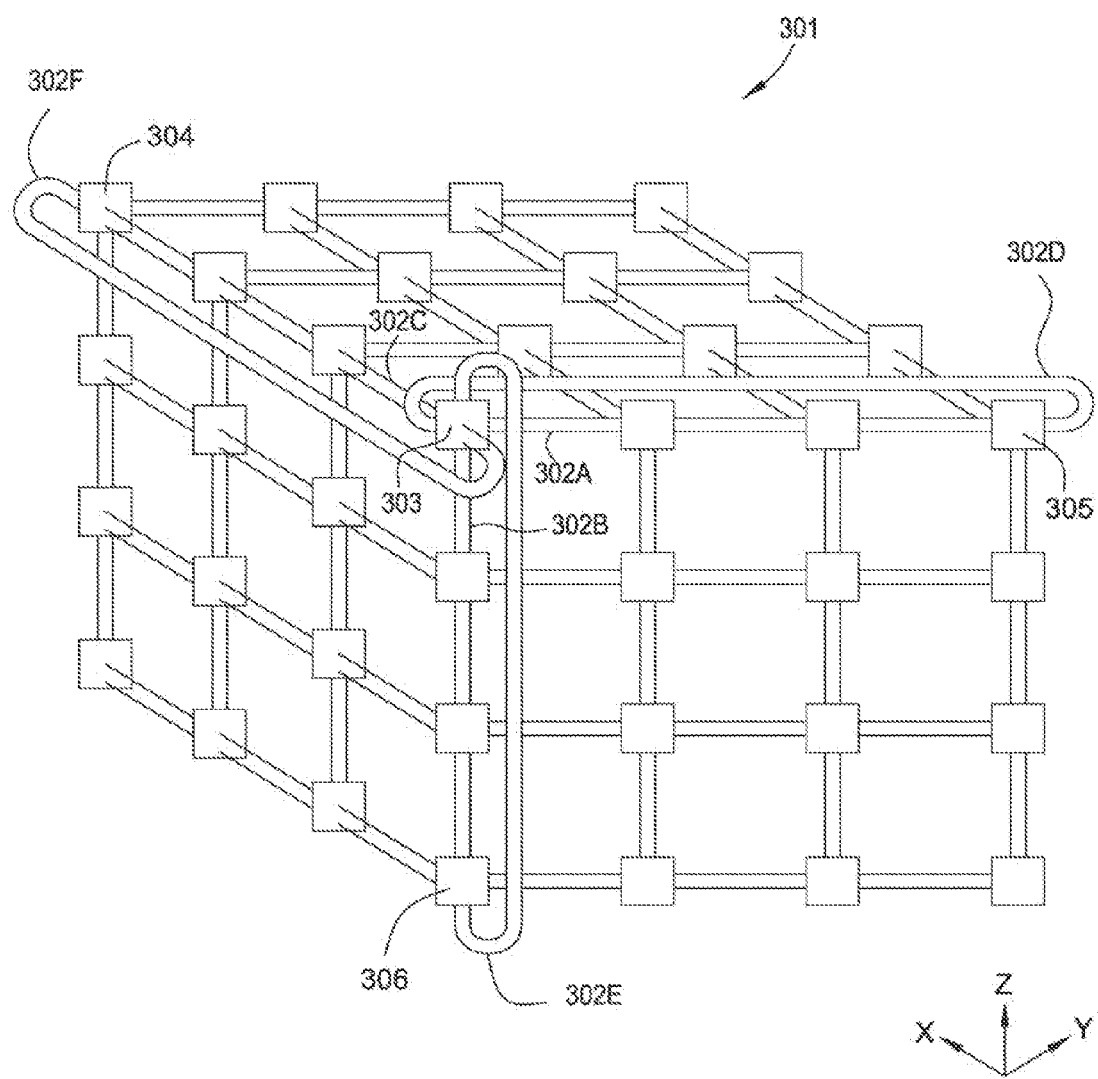
FIG. 3 illustrates of a three-dimensional torus network of a system, according to one embodiment of the invention.

As stated, in a massively parallel computer system 152, compute nodes 212 may be logically arranged in a three-dimensional torus, where each compute node 212 may be identified using an x, y and z coordinate. FIG. 3 illustrates an example of a three-dimensional torus network of system 152, according to one embodiment of the invention. More specifically, FIG. 3 illustrates a 4×4×4 torus 301 of compute nodes, in which the interior nodes are omitted for clarity. Although FIG. 2 shows a 4×4×4 torus having 64 nodes, it will be understood that the actual number of compute nodes in a parallel computing system is typically much larger. For example, a Blue Gene/L system may be configured with 65,536 compute nodes 212 along with an additional 1024 I/O nodes 211. Illustratively, each compute node 212 in torus 301 includes a set of six node-to-node communication links 302A-F which allows each compute nodes in torus 301 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 301, as shown in FIG. 3, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 3 by links 302D, 302E, and 302F which wrap around from compute node 303 to other end of compute core 301 in each of the x, y and z dimensions. Thus, although node 303 appears to be at a "corner" of the torus, node-to-node links 302A-F link node 303 to nodes 304, 305, and 306, in the x, y, and Z dimensions of torus 301.

Figure 4:
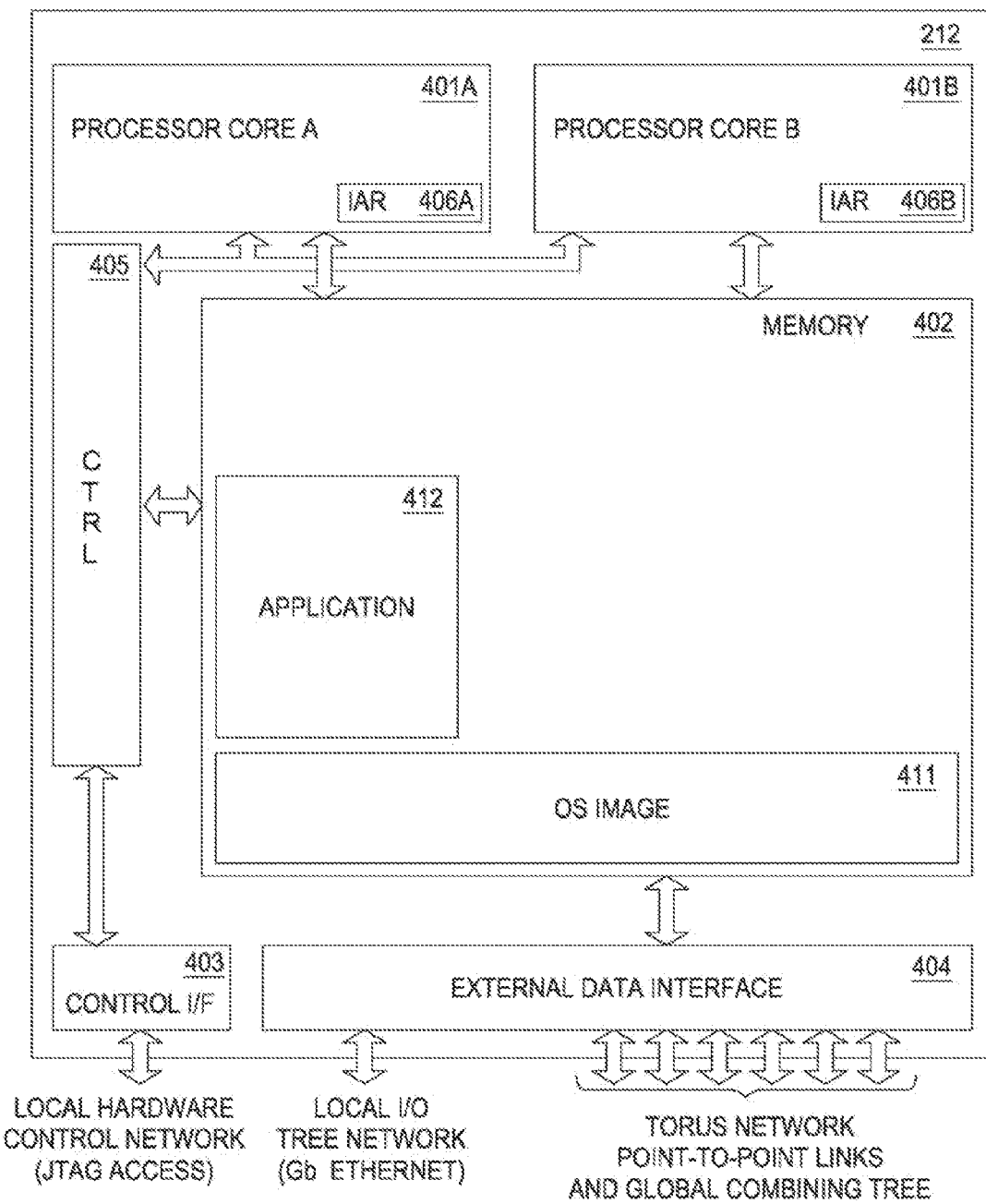
FIG. 4 illustrates components of a compute node of the system of FIG. 2, according to one embodiment of the invention.

FIG. 4 illustrates components of a compute node 212 of the system 152 of FIG. 2, according to one embodiment of the invention. As shown, compute node 212 includes processor cores 401A and 401B, each having an instruction address register 406A and 406B. Compute node 212 also includes memory 402 used by both processor cores 401; an external control interface 403 which is coupled to local hardware control network 214 (e.g., control system network 206); an external data communications interface 404 which is coupled to the corresponding local I/O tree network 213 and the corresponding six node-to-node links 302 of the torus network 301; and includes monitoring and control logic 405 which receives and responds to control commands received through external control interface 403. Monitoring and control logic 405 may access processor cores 401 and locations in memory 402 on behalf of service node 202 to read (or in some cases alter) the operational state of node 212. In one embodiment, each compute node 212 may be physically implemented as a single integrated circuit.

As described, functional network 205 may service many I/O nodes 213, and each I/O node 213 is shared by a group of compute nodes 212 (i.e., a Pset). Thus, it is apparent that the I/O resources of parallel system 152 are relatively sparse when compared to computing resources. Although it is a general purpose computing machine, parallel system 152 is designed for maximum efficiency in applications which are computationally intense.

As shown in FIG. 4, memory 402 stores an operating system image 411. Operating system image 411 provides a copy of a simplified-function operating system running on compute node 212, referred to as a compute node kernel. The compute node kernel provides a minimal set of functions required to support operation of the compute node 212. In one embodiment, an application 312 may also reside within memory 302. In one embodiment, the application 312 may be configured to perform compute intensive operations, such as a molecular docking analysis routine.

In one embodiment, a copy of the application 412 may be present and executing on thousands of compute nodes 112, where, each compute node executes a copy of application 412 but maintains application data local to a given compute node 112. In another embodiment, some compute nodes may execute a different application, or simply remain idle. Further, applications running on the compute nodes 112 may be configured to share and transfer application data using well known message passing techniques (e.g., MPI or ARMCI). For example, the application 112 may be configured to perform an analysis routine using data returned from a query result. Further, the application 412 on one (or more) compute nodes 112 may provide a query tool used by a user to compose a database query. In such a case, the actual database may be spread across another group of compute nodes (or on another system altogether). Further still, the query tool may allow a user to invoke (or invoke on behalf of the user) an analysis using data returned for a given database query. As stated, in such a case, the analysis routine may be performed on a large number of compute nodes 112.

Figure 5A:
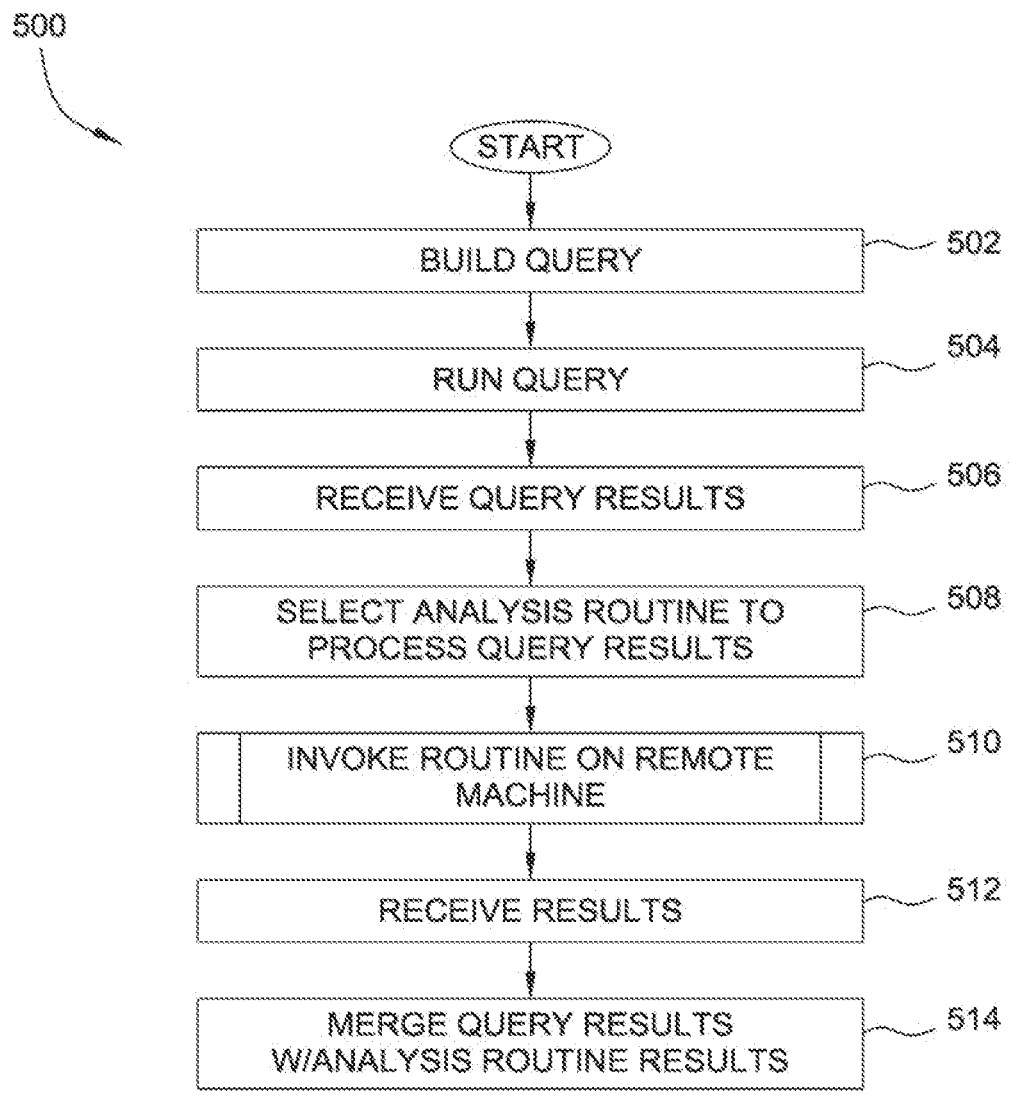
FIG. 5A is a flowchart illustrating a method for invoking an application running on a massively parallel computer system from a query interface, according to one embodiment of the invention.
Figure 5B:
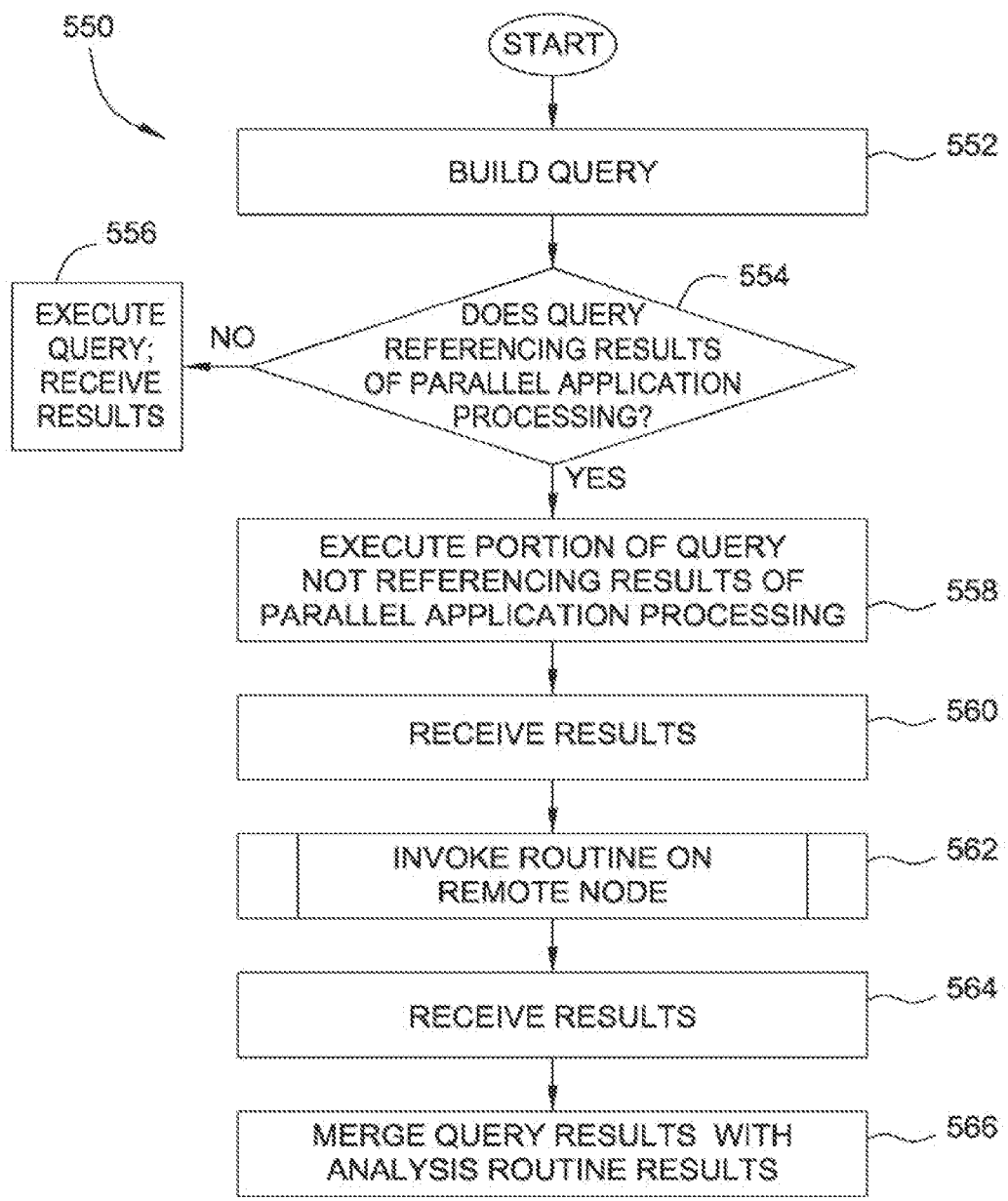
FIG. 5B is a flowchart illustrating a method for automatically invoking an application running on a massively parallel computer system using a parallel application extension of a query condition, according to one embodiment of the invention.
Figure 5C:
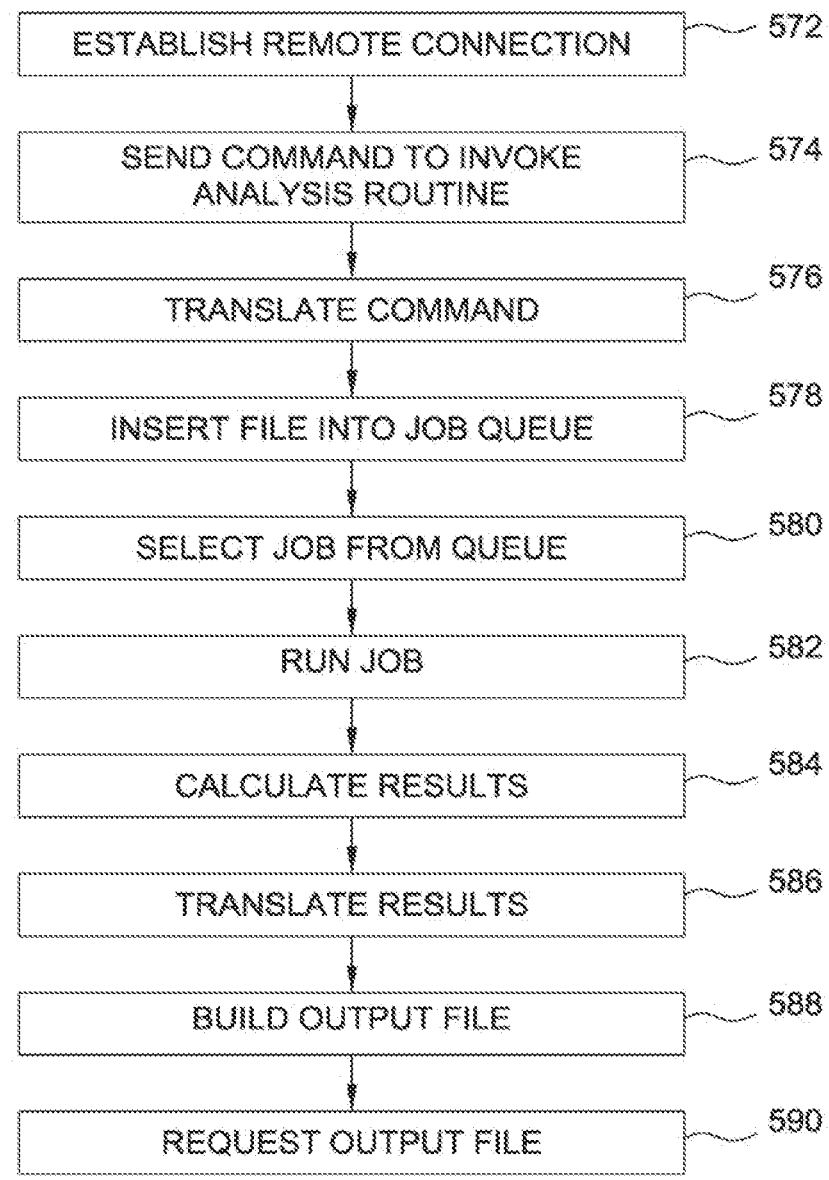
FIG. 5C is a flowchart illustrating a method for communicating with a massively parallel computer system to invoke an application running on the massively parallel computer system, according to one embodiment of the invention.

FIGS. 5A-5C are flowcharts illustrating methods for invoking an analysis routine on a massively parallel computer system from a query interface, according to embodiments of the invention. For example, FIG. 5A illustrates a method 500 for invoking an analysis routine on a massively parallel computer system 152 by selecting the analysis routine via the GUI 122. As shown, the method 500 begins at step 502, where a user interacts with the query builder application 120 to compose a query requesting a set of data records from data repository 150. At step 504, the query is executed against the data repositories 150. At step 506, the query results are returned to the query builder application 120 and displayed to the user via the GUI 122.

At step 508, after the query results are received and displayed to the user, the user may select an analysis routine (via the GUI 122) to process the query results. Once an analysis routine is selected, the query builder application 120 may invoke the analysis routine on the massively parallel computing system 152 (step 510). Actions relating to invoking the routine on the massively parallel computing system 152 are further illustrated with respect to FIG. 5C.

After the routine finishes executing, the query builder application may receive the analysis routine results (step 512) from the massively parallel computing system 152 and merge the analysis routine results with the query results (step 514).

FIG. 5B illustrates a method for invoking an analysis routine on a massively parallel computer system 152, according to one embodiment. In this example, the analysis routine executed on the parallel system may be invoked directly in response to a query condition having a parallel application extension. As shown, the method 550 begins at step 552, where a user interacts with the the query builder application 120 to build a query requesting a set of data records from data repository 150. The query may comprise a plurality of query conditions. In one embodiment, some query conditions may have database extensions, while other query conditions may have parallel application extensions.

Before executing the query, the query builder application 124 may determine the extension associated with each of the query conditions (step 554) and execute the query accordingly. For example, if all of the query conditions only have a database extension, then the entire query is executed against the data repositories 150 (at step 556). On the other hand, if a query contains a combination of query conditions, where some conditions have a database extension and other conditions have a parallel application extension, the query builder application 120 may first execute the query conditions having a database extension (step 558). Upon receiving the query results (at step 560), the query builder application 120 may invoke an analysis routine, based on the query conditions associated with parallel application extensions, on those query results (step 562). Actions relating to invoking the routine on the massively parallel computing system 152 are further illustrated with respect to FIG. 5C.

After the routine finishes executing, the query builder application 120 may receive the analysis routine results from the massively parallel computing system 152 (step 564), merge the analysis routine results with the query results (step 566), and display the final result to the user.

Regardless of the method (as illustrated in FIGS. 5A and 5B) used to invoke an analysis routine, the communication that occurs between a computing system 100 and a massively parallel computer system 152 to invoke an analysis routine may be performed by a method illustrated in FIG. 5C. Specifically, FIG. 5C is a flowchart illustrating a method 570 for communicating with a massively parallel computer system 152 to invoke an analysis routine, according to one embodiment of the invention.

As shown, the method 570 begins at step 572, where the query builder application 120 establishes a remote connection with the massively parallel computer system 152. At step 574, once a connection is established, the query builder application 120 may send a command to invoke an analysis routine running on the massively parallel computer system 152. In addition, the query builder application 120 may also send data (i.e. query results) for the analysis routine to analyze. At step 576, once the command and/or data is received, the translator 224 translates the received command and data into a format understandable by the massively parallel computer system 152. For example, the translator 224 may extrapolate command strings, parameters, variables, and the like, from the command and data received from the query builder application 120 and write them into an input text file.

Supplying an input text file in this manner provides the benefit of the massively parallel computer system 152 not having to incorporate a database interface to communicate with the query builder application 120. Instead, the massively parallel computer system 152 simply has to parse an input text file to obtain a command and data.

At step 578, once an input text file is created, the file is transmitted to the job queue 226, where it awaits execution. At step 576, the input text file is selected from the job queue 226 and executed at step 582. Once the analysis routine is executed, the results are calculated (at step 584) and returned to the translator 224. That is, at step 582, the massively parallel computing system may be used to execute an application to analyze the data received as part of a database query result. At step 586, the translator 224 translates the results received from the parallel computing system into a format understood by the query builder application 120. For example, the translator 224 may format the results into a table format and write the table into an output text file (step 588). In one embodiment, once the output text file is created, the job queue 226 may notify the query builder application 120 that the analysis routine has finished executing.

At step 590, the query builder application 120 may request the output text file from the massively parallel computer system 152. Once received, the query builder application 120 may parse the output text file for the result table and subsequently merge the result table into the rest of the query results (received from previously querying the data repositories 150).

Figure 6:
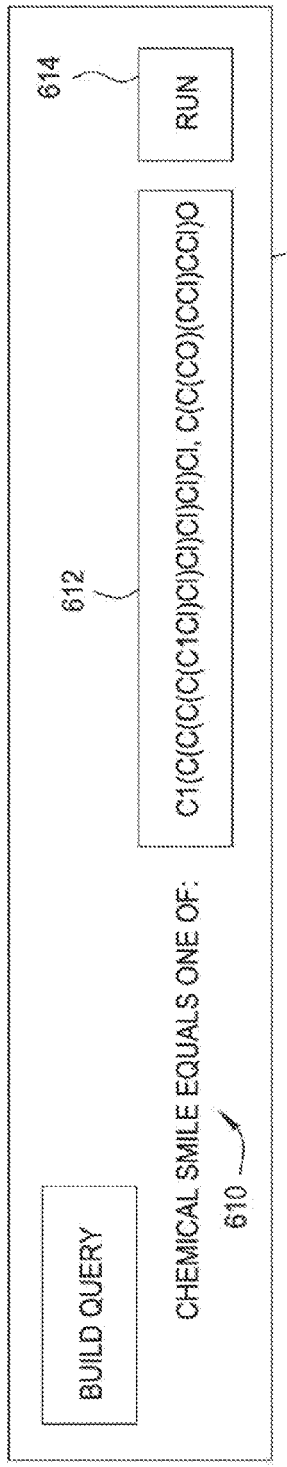
FIG. 6 illustrates a graphical user interface (GUI) screen which presents a query to a user, according to one embodiment of the invention.
Figure 7:
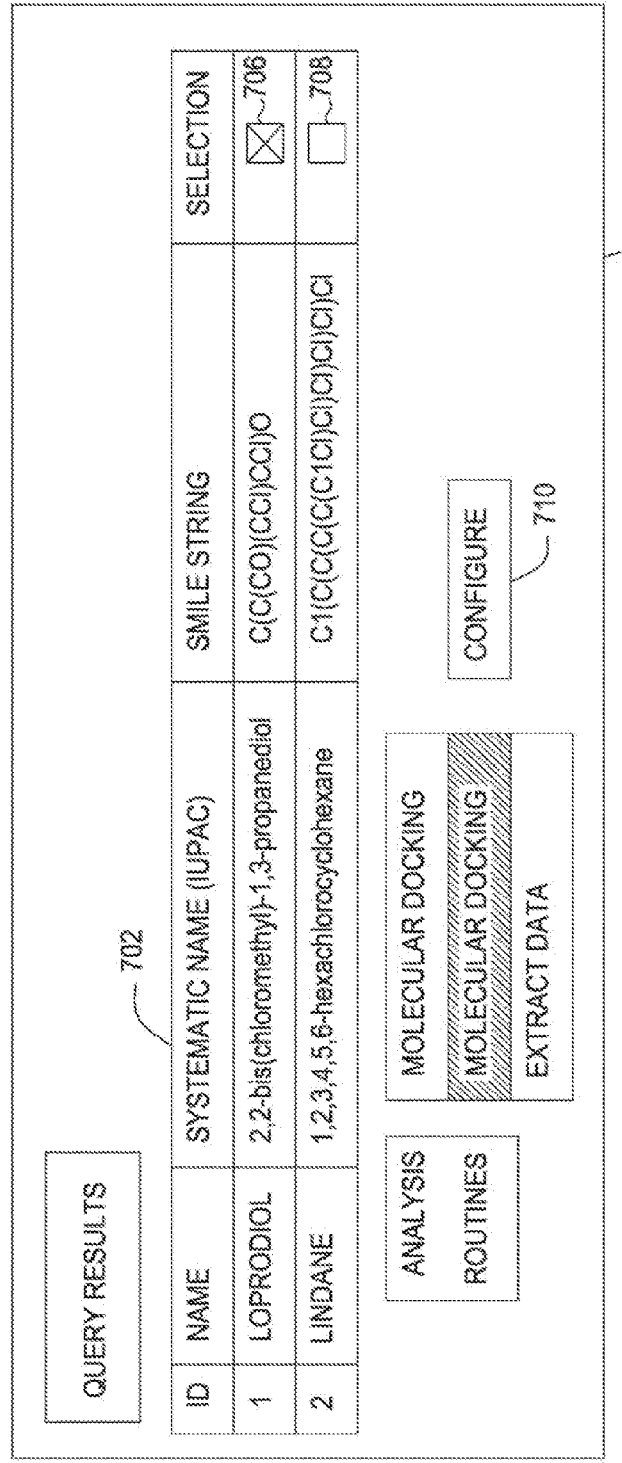
FIG. 7 illustrates a GUI screen which presents query results for the query from FIG. 6, according to one embodiment of the invention.
Figure 8:
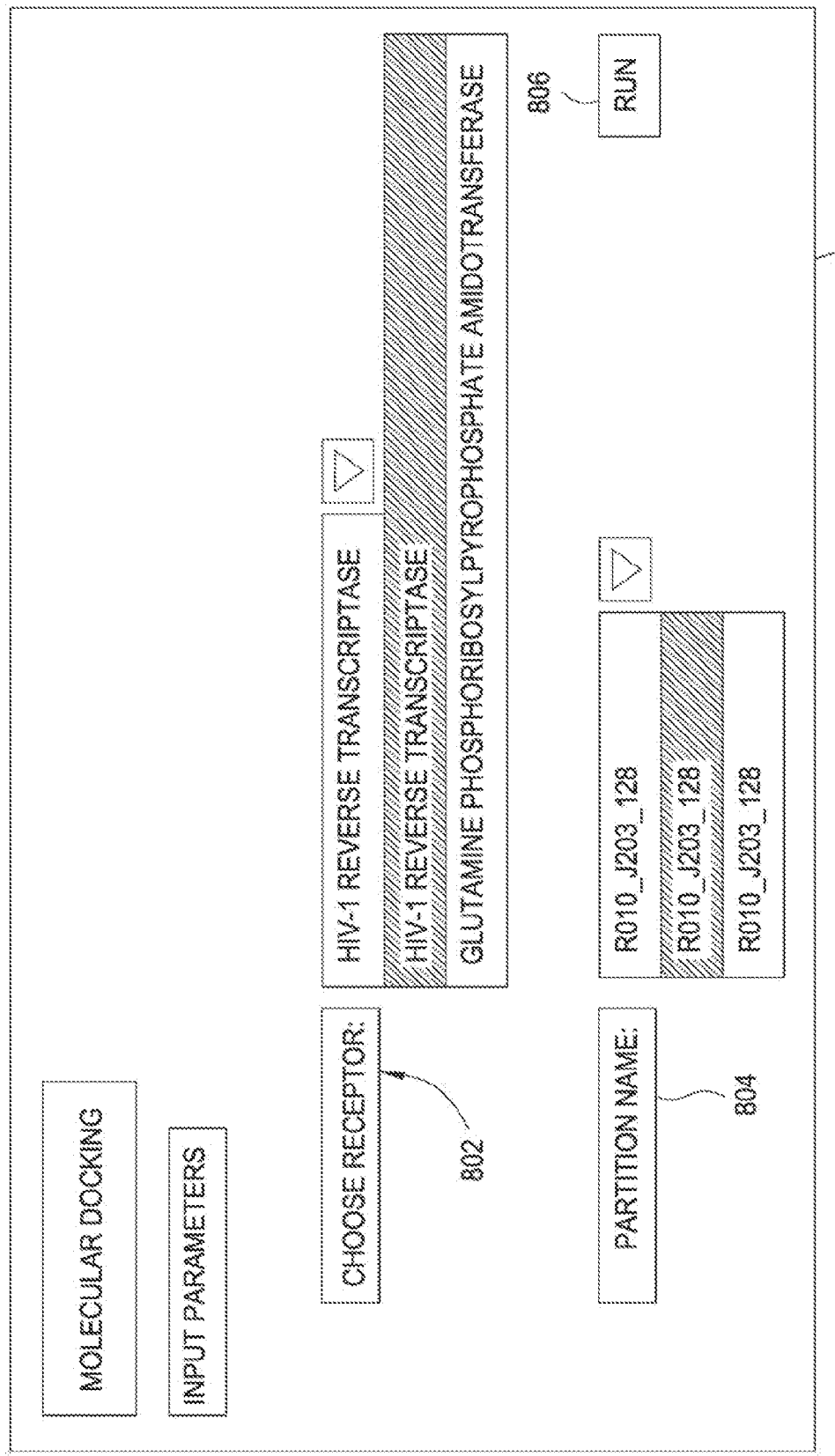
FIG. 8 illustrates a GUI screen which presents a configuration screen for an analysis routine, according to one embodiment of the invention.

FIGS. 6-8 provide an example of GUI screens representative of the method illustrated in FIG. 5A. FIG. 9 shows a GUI screen representative of the method illustrated in FIG. 5B.

FIG. 10 shows a GUI screen displaying the results from an executed analysis routine that are merged with query results.

FIG. 6 illustrates a GUI screen 600 which presents a query to a user, according to one embodiment of the invention. As shown, the GUI 600 presents a query condition 610 that allows a user to search for molecular compounds (e.g. a ligand) stored in the data repositories 150 by entering in Simplified Molecular Input Line Entry (SMILE) strings for the compounds in a text box 612. Illustratively, a user has inputted two SMILE strings (C1(C(C(C(C(C1C1)C1)C1) C1)C1)C1 and C(C(CO(CC1)CC1)O). Once the strings are entered, the user may execute the query by pressing the 'RUN' button 614. In other words, the query searches for compounds having one of the functional groups specified by the SMILE strings.

FIG. 7 illustrates a GUI screen presenting query results for the query from FIG. 6, according to one embodiment of the invention. As shown, the query returned two results based on the SMILE strings entered by the user. The results are formatted as a table 702. The table 702 displays the name of two ligands (i.e. 'LOPRODIOL' and 'LINDANE'), the systematic or International Union of Pure and Applied Chemistry (IUPAC) name (i.e. '2,2-bis(chloromethyl)-1,3-propanediol' and '1,2,3,4,5,6-hexachlorocyclohexane') of the compounds, and the associated SMILE strings (i.e. 'C(C(CO(CC1)CC1)O' and C1(C(C(C(C(C1C1)C1)C1)C1)C1') of the compounds.

As shown, the GUI 700 also displays analysis routines 704 that can be executed on the ligands returned for the search query of FIG. 6/. Illustratively, two analysis routines are shown, 'MOLECULAR DOCKING' and 'EXTRACT DATA.' Additionally, which ligands are analyzed by the analysis routine may be selected by a check box 706, 708. In this example, a user has selected 'LOPRODIOL' to be analyzed by the 'MOLECULAR DOCKING' analysis routine. Once a ligand and an analysis routine are selected, the user may configure the analysis routine by pressing the 'CONFIGURE' button 710. An example GUI screen for configuring an analysis routine is described with reference to FIG. 8

FIG. 8 illustrates a GUI screen 800 for configuring a molecular docking analysis routine, according to one embodiment of the invention. As shown, the GUI 800 presents input parameters 802, 804 that can be selected to configure the molecular docking analysis routine. For example, a user may choose a receptor that is to be docked with 'LOPRODIOL' (as was previously selected in FIG. 7). As shown, a user has selected 'HIV-1 REVERSE TRANSCRIPTASE.' A user may also select which partition (i.e. a group of compute nodes 212) of the massively parallel computer system 152 to run the analysis routine. Once the receptor and the partition are selected, the user may invoke the analysis routine on the massively parallel computer system 152 by pressing the 'RUN' button 806. After the analysis routine completes, the results are returned to the query builder application 120 and merged with the query results. The merged results are shown with reference to FIG. 10.

Alternatively, as discussed above with reference to FIG. 5B, an analysis routine may be invoked in response to a query condition having a parallel application extension. FIG. 9 illustrates a GUI screen 900 for building a query having conditions with parallel application extensions, according to one embodiment of the invention. As shown, the GUI 900 presents three query conditions: a chemical SMILE string condition 902, a receptor input condition 904, and an energy of interaction condition 906. In one embodiment each of these query conditions may have an associated extension, for example a database extension or a parallel application extension. In this example, the chemical SMILE condition 902 and the receptor input condition 904 has a database extension, where the energy of interaction condition 906 has a parallel application extension.

The chemical SMILE string condition 902 may be provided to search for molecular compounds (i.e. ligands) stored in data repositories 150 (as shown, a user has entered in chemical SMILE strings C1(C(C(C(C(C1C1)C1)C1)C1) C1 and C(C(CO(CC1)CC1)O). The receptor input condition 904 may be provided to identify a receptor to bond with the ligand indicated by the chemical SMILE string (as shown, a user has selected the HIV-1 REVERSE TRANSCRIPTASE receptor). The energy of interaction condition 906 may be provided to find the energy of interaction between the ligand and the receptor with respect to a certain value. As shown, a user is trying to find conformations of one of the compounds in SMILE string condition 902 and the receptor in receptor input condition 904 that has a Van der Waal's force greater than −50).

After a user builds the query, the query may be executed by pressing the 'RUN' button 908. Upon execution, the query builder application 120 identifies the extensions associated with the query conditions. For those conditions identified as having a database extension (i.e. the chemical SMILE condition 902 and the receptor input condition 904), the query builder application 120 queries the data repositories using only those conditions. Once the results are returned for those conditions, the query builder application 120 may invoke an analysis routine to analyze the query results. The analysis routine invoked may be based on those query conditions having a parallel application extension (i.e. the energy of interaction condition 906). For example, the parallel application extension may indicate that the energy of interaction condition 906 is associated with a molecular docking analysis routine. Thus, the molecular docking analysis may be selected for invocation on the massively parallel computer system 152. Once the analysis routine completes, the results are returned to the query builder application 120 and merged with the query results. FIG. 10 shows an example of the merged results for this query.

Specifically, FIG. 10 illustrates a GUI screen 1000 which presents query results and analysis routine results merged into a table 1002, according to one embodiment of the invention. As shown, the table 1002 contains the compound name ('LOPRODIOL') and the receptor name ('HIV-1 REVERSE TRANSCRIPTASE'). In addition, the table 1002 contains the Van der Waal's ('VDW') force 1004, and other data calculated as a result of the molecular docking analysis routine (i.e. 'ANCHORS,' 'ORIENTATIONS,' and 'CONFORMATIONS'). The compound name and the receptor was determined from the query results received from the data repositories 150 and the 'VDW' force, 'ANCHORS', 'ORIENTATIONS', and 'CONFORMATIONS' were determined from the molecular docking analysis routine. As shown, both the query results and the analysis results are merged together and presented to the user.

Advantageously, embodiments of the invention allow users to invoke an analysis routine running on a massively parallel computer system to analyze query results. For example, after receiving query results from query to a database, a user may invoke a complex analysis performed by the massively parallel computer system using the query results. Alternatively, a user may build a query that includes specific conditions evaluated by an analysis routine on a massively parallel computer system (as opposed to selecting an analysis routine after receiving query results).

While the foregoing is directed to embodiments of the present invention, other and further embodiments of the invention may be devised without departing from the basic scope thereof, and the scope thereof is determined by the claims that follow.

What is claimed is:

1. A computer-implemented method of invoking an analysis routine on a parallel computer system, comprising:
submitting a query generated using a query builder application for execution against a database to produce query results;
receiving a selection of one of a plurality of analysis routines to apply to the query results;
transmitting a command and the query results to a compute node of a parallel computer system using an established network connection, wherein the compute node is configured to translate the command and the query results into a format recognized by the selected analysis routine, and wherein each of the plurality of analysis routines is configured to recognize input data in a respective one of a plurality of formats;
invoking the selected analysis routine on the parallel computing system using the translated command and the query results to produce analysis routine results, wherein the compute node is further configured to translate the command and the query results by extracting at least one of command strings, parameters, and variables from at least one of the command and the query results, wherein the compute node is further configured to write the translated command and the translated query results to an input file, and wherein the analysis routine is configured to parse the input file to obtain the translated command and the translated query results;
merging the analysis routine results with the query results to produce merged results; and
outputting the merged results for display.

2. The method of claim 1, further comprising storing the input file in a job queue maintained by the compute node.

3. The method of claim 1, wherein the compute node is further configured to translate the analysis routine results to a second format that is recognized by the query builder application and to write the translated analysis routine results to a result table, wherein the compute node is further configured to write the result table containing the translated analysis routine results to an output file, and further comprising: receiving the output file from the compute node of the parallel computer system.

4. The method of claim 3, wherein merging the analysis result with the query result comprises joining the formatted analysis result as a result table and wherein outputting the merged results for display comprises outputting the result table for display.

5. The method of claim 1, wherein the analysis routine is a molecular docking algorithm.

6. The method of claim 1, wherein the compute node is one of a plurality of compute nodes in the parallel computing system, and wherein the plurality of compute nodes are organized in a torus network configuration.

7. A system, comprising:
a processor; and
a memory containing a program that, when executed on the processor, performs an operation for invoking an analysis routine on a parallel computer system, comprising:
submitting a query generated using a query builder application for execution against a database to produce query results;

receiving a selection of one of a plurality of analysis routines to apply to the query results;

transmitting a command and the query results to a compute node of a parallel computer system using an established network connection, wherein the compute node is configured to translate the command and the query results into a format recognized by the selected analysis routine, and wherein each of the plurality of analysis routines is configured to recognize input data in a respective one of a plurality of formats;

invoking the selected analysis routine on the parallel computing system using the translated command and the query results to produce analysis routine results, wherein the compute node is further configured to translate the command and the query results by extracting at least one of command strings, parameters, and variables from at least one of the command and the query results, wherein the compute node is further configured to write the translated command and the translated query results to an input file, and wherein the analysis routine is configured to parse the input file to obtain the translated command and the translated query results;

merging the analysis routine results with the query results to produce merged results; and outputting the merged results for display.

8. The system of claim 7, the operation further comprising storing the input file in a job queue maintained by the compute node.

9. The system of claim 7, wherein the compute node is further configured to translate the analysis routine results to a second format that is recognized by the query builder application and to write the translated analysis routine results to a result table, wherein the compute node is further configured to write the result table containing the translated analysis routine results to an output file, and the operation further comprising: receiving the output file from the compute node of the parallel computer system.

10. The system of claim 9, wherein merging the analysis result with the query result comprises joining the formatted analysis result as a result table and wherein outputting the merged results for display comprises outputting the result table for display.

11. The system of claim 7, wherein the analysis routine is a molecular docking algorithm.

12. The system of claim 7, wherein the compute node is one of a plurality of compute nodes in the parallel computing system, and wherein the plurality of compute nodes are organized in a torus network configuration.

13. A computer-readable storage device containing a program that, when executed, performs an operation for invoking an analysis routine on a parallel computer system, comprising: submitting a query generated using a query builder application for execution against a database to produce query results; receiving a selection of one of a plurality of analysis routines to apply to the query results; transmitting a command and the query results to a compute node of a parallel computer system using an established network connection, wherein the compute node is configured to translate the command and the query results into a format recognized by the selected analysis routine, and wherein each of the plurality of analysis routines is configured to recognize input data in a respective one of a plurality of formats; invoking the selected analysis routine on the parallel computing system using the translated command and the query results to produce analysis routine results, wherein the compute node is further configured to translate the command and the query results by extracting at least one of command strings, parameters, and variables from at least one of the command and the query results, wherein the compute node is further configured to write the translated command and the translated query results to an input file, and wherein the analysis routine is configured to parse the input file to obtain the translated command and the translated query results; merging the analysis routine results with the query results to produce merged results; and outputting the merged results for display.

14. The computer-readable storage device of claim 13, the operation further comprising storing the input file in a job queue maintained by the compute node.

15. The computer-readable storage device of claim 13, wherein the compute node is further configured to translate the analysis routine results to a second format that is recognized by the query builder application and to write the translated analysis routine results to a result table, wherein the compute node is further configured to write the result table containing the translated analysis routine results to an output file, and the operation further comprising: receiving the output file from the compute node of the parallel computer system.

16. The computer-readable storage device of claim 15, wherein merging the analysis result with the query result comprises joining the formatted analysis result as a result table and wherein outputting the merged results for display comprises outputting the result table for display.

17. The computer-readable storage device of claim 13, wherein the analysis routine is a molecular docking algorithm.

18. The computer-readable storage device of claim 13, wherein the compute node is one of a plurality of compute nodes in the parallel computing system, and wherein the plurality of compute nodes are organized in a torus network configuration.

* * * * *